(12) United States Patent
Lindemulder

(10) Patent No.: US 11,024,473 B2
(45) Date of Patent: Jun. 1, 2021

(54) EXTENDED PROTECTION SURGE ARRESTER DEVICE

(71) Applicant: Paul Lindemulder, Saint John, IN (US)

(72) Inventor: Paul Lindemulder, Saint John, IN (US)

( * ) Notice: Subject to any disclaimer, the term of this patent is extended or adjusted under 35 U.S.C. 154(b) by 161 days.

(21) Appl. No.: 16/382,378

(22) Filed: Apr. 12, 2019

(65) Prior Publication Data
US 2019/0318888 A1 Oct. 17, 2019

Related U.S. Application Data

(60) Provisional application No. 62/656,950, filed on Apr. 12, 2018.

(51) Int. Cl.
*H02H 9/00* (2006.01)
*H01H 9/08* (2006.01)
*H02H 3/02* (2006.01)

(52) U.S. Cl.
CPC ............ *H01H 9/08* (2013.01); *H02H 3/025* (2013.01)

(58) Field of Classification Search
None
See application file for complete search history.

(56) References Cited

U.S. PATENT DOCUMENTS

| 3,671,800 | A | * | 6/1972 | Stetson | H01T 4/20 315/36 |
| 4,298,815 | A | * | 11/1981 | Ishihara | H01T 4/08 313/318.01 |
| 4,320,432 | A | * | 3/1982 | Duenke | H01F 27/402 174/18 |
| 5,057,810 | A | * | 10/1991 | Raudabaugh | H01T 1/14 337/30 |
| 5,113,167 | A | * | 5/1992 | Raudabaugh | H01T 1/14 337/16 |
| 5,400,207 | A | * | 3/1995 | Krause | H01T 1/14 361/117 |
| 5,426,555 | A | * | 6/1995 | Lundquist | H01T 1/14 361/117 |
| 7,656,639 | B2 | * | 2/2010 | Woodworth | H01C 7/12 361/127 |
| 8,638,537 | B2 | * | 1/2014 | Kester | H02G 1/02 361/118 |
| 2008/0068122 | A1 | * | 3/2008 | Lenk | H01H 39/002 337/30 |

* cited by examiner

*Primary Examiner* — Stephen W Jackson
(74) *Attorney, Agent, or Firm* — Scherrer Patent & Trademark Law, P.C.; Stephen T. Scherrer; Monique A Morneault

(57) ABSTRACT

An add on device assembly for surge arresters used in substation, distribution and transmission applications that provides a means to electrically and mechanically disconnect a surge arrester at the end of life, such that it leaves a physical dimension between electrodes that is able to withstand normal system voltage and at the same time continue to provide surge protection until the arrester is replaced. The assembly contains a spring locking assembly that will lock a line spacing buss in an open position post isolator operation. The resultant gap is set to provide sufficient air insulation for system voltage and at the same sufficient surge protection for the system Basic Insulation Level.

5 Claims, 4 Drawing Sheets

EXTENDED PROTECTION SURGE ARRESTER DEVICE

The present invention claims priority to U.S. Prov. Pat. App. No. 62/656,950, titled "Extended Protection Surge Arrester Device," filed Apr. 12, 2018, which is incorporated by reference here in its entirety.

TECHNICAL FIELD

The present disclosure relates to an add-on device assembly for surge arresters used in substation, distribution and transmission applications. Specifically, the present invention provides a means to electrically and mechanically disconnect a surge arrester in the end of life event such that it leaves a physical dimension between electrodes that is able to withstand normal system voltage and at the same time continue to provide surge protection until the arrester is replaced.

BACKGROUND

Surge arresters are typically used on power distribution and transmission circuits to protect the connected equipment and insulation systems from electrical surges, typically from lightning strikes or equipment switching events, by redirecting surges to ground through the surge arrester. The surge arrester utilizes metal oxide varistor (MOV) technology that instantaneously senses electrical surges and provides a very low resistance path to ground thereby reducing the voltage spike associated with the surge and thus protecting the nearby equipment. However, excessive surges, internal breakdown of the MOV system, or over time repeated surges, can cause the arrester to short circuit, or reach what is known as end of life. Distribution surge arresters typically contains an isolator, or disconnector, device that separates the surge arrester from the circuit physically and electrically, allowing the upstream fusing, or breaker equipment, to interrupt the fault current and restore the system to normal operation. The operation of the isolator also provides a visual indication that the surge arrester is no longer protecting the circuit and needs to be replaced. Typical isolators are disclosed in U.S. Pat. Nos. 5,057,810 and 5,113,167 to Raudabaugh, U.S. Pat. No. 5,400,207 to Krause and U.S. Pat. No. 8,638,537 to Kester.

Substation surge arresters typically do not utilize a disconnect device. Conventionally, substation applications are concerned with having constant surge protection for the critical substation and power plant equipment. In the event of arrester end of life, the arrester will short circuit and cause the substation current protection to operate and remove power from the circuit the arrester is protecting. Once this occurs, the arrester must be replaced before the power can be restored to that circuit, or even a power plant generator, potentially causing an outage to many customers for an extended period until the arrester can be physically replaced.

SUMMARY OF THE INVENTION

The present disclosure provides a surge arrester add on assembly utilizing a disconnecting device with a mechanical lockout mechanism and a remaining gap spacing that provides insulating properties sufficient for temporary system voltage operation, at the same time a spacing that provides sufficient surge protection for the same system equipment. This will provide the system operation to immediately restore the power to the circuit and operate in a long term extended protection mode until a system outage can be scheduled to replace the arrester.

Further the invention provides a means to utilize ground fault current flow sensors to automatically sense the arrester was the cause of the short circuit event and allow current protection equipment to programmatically wait an appropriate time to allow the fault to clear and the mechanical lockout mechanism to open the spacing for the voltage clearance, then automatically restore the power to the circuit in the temporary protection mode. This will provide maximum customer service and potentially prevents major power plant costs for an unplanned outage.

It is, therefore, an advantage and objective of the present invention to provide an improved surge arrester design to provide immediate power restoration and temporary surge protection at the time of arrester end of life until the arrester replacement outage can be scheduled.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present disclosure provides an arrester assembly for electrical isolation at the same time it provides extended minimum surge protection for the equipment it is protecting. It further provides a means for current sensing devices to determine the arrester end of life was the cause of the fault current and during interruption the assembly cleared the gap for extended protection. Specifically, the surge arrester add on assembly comprises a line connector or clamp, an isolator, a line spacing buss, a spring loaded locking mechanism all attached to the arrester unit or module.

Figure 1:
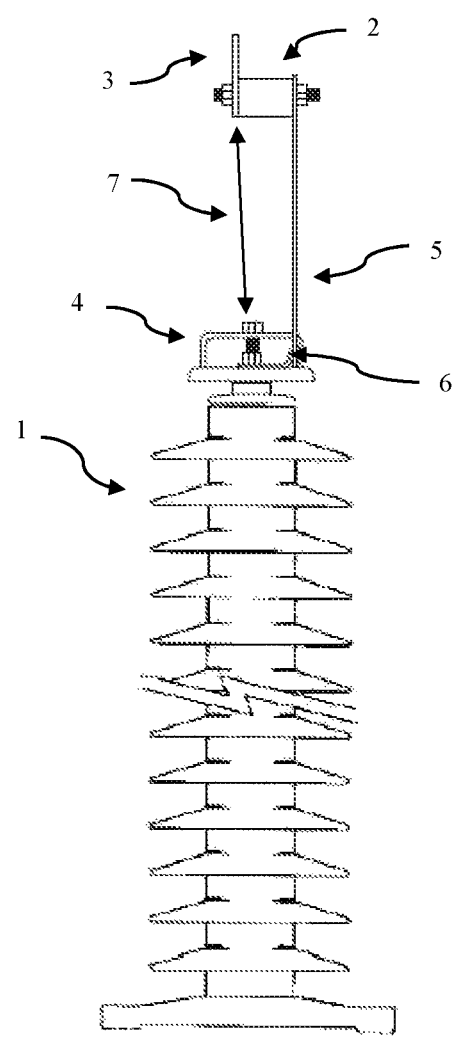
FIG. 1 illustrates the typical surge arrester with extended protection assembly installed on the top of the arrester.
Figure 2:
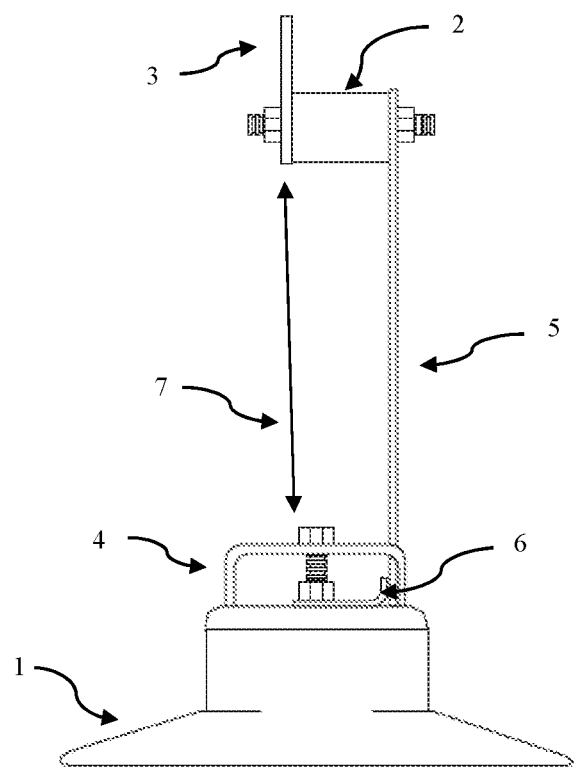
FIG. 2 illustrates the extended protection assembly detail as in pre end of life condition.
Figure 3:
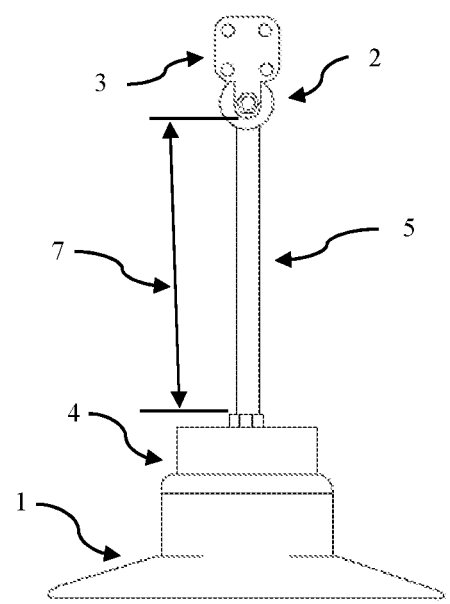
FIG. 3 illustrates the extended protection assembly detail as in pre end of life condition, 90 degree view.
Figure 4:
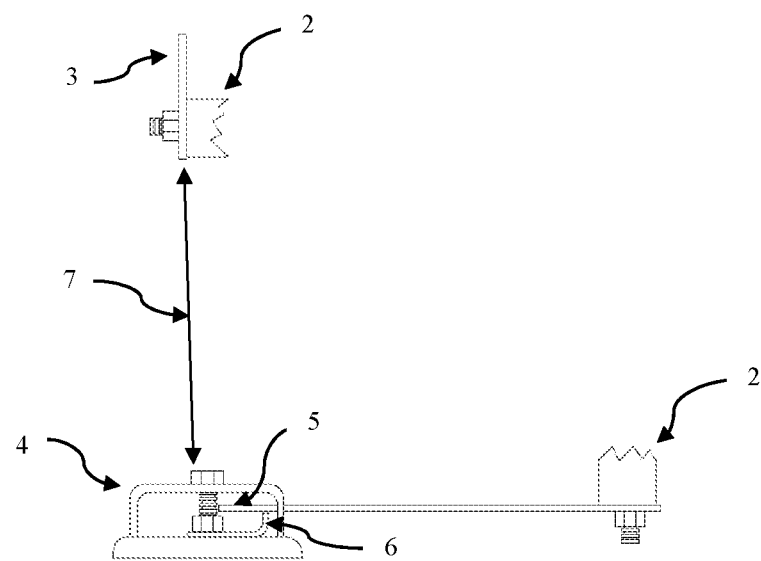
FIG. 4 illustrates the extended protection assembly detail as in post end of life condition.
Figure 5:
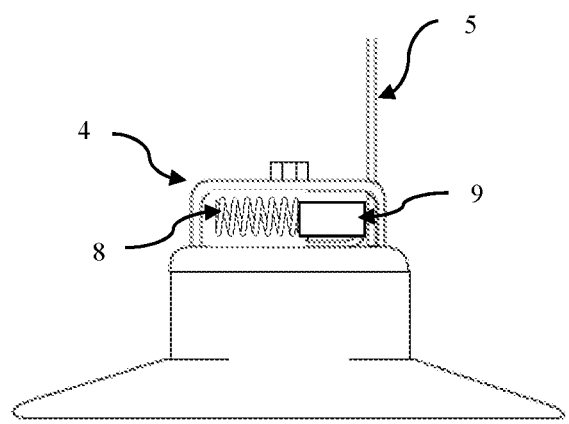
FIG. 5 illustrates an alternate spring mechanism as in pre-end of life condition.
Figure 6:
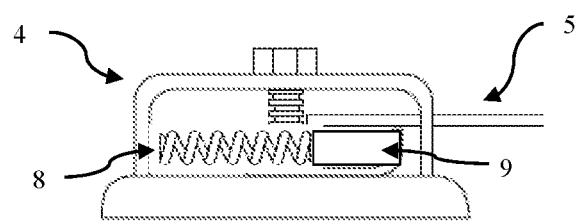
FIG. 6 illustrates an alternate spring mechanism as in post end of life condition.
Figure 7:
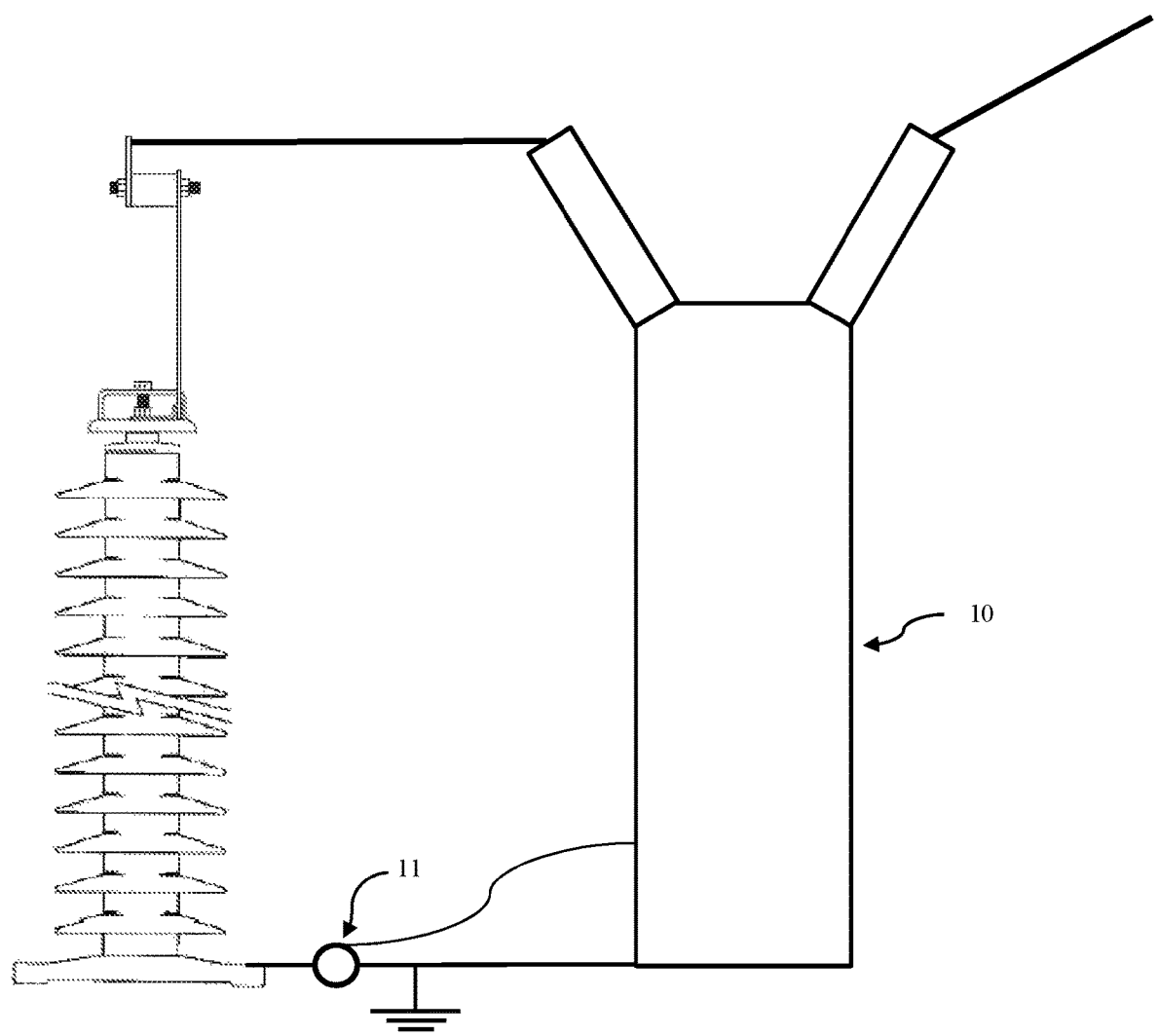
FIG. 7 illustrates the surge arrester with extended protection assembly as connected in the circuit with the substation current protection and ground sensing system.

Now referring to the figures, wherein like numerals refer to like parts, FIG. 1 illustrates a side view of surge arrester unit with assembly in the installed position. The arrester module 1 is connected to the spring loaded locking mechanism 4 and 6 contacting to the line spacing buss 5. The line spacing buss 5 is connected to the isolator 2. The isolator 2 is connected to the line connector or clamp 3. The line spacing buss 5 length is predetermined such that the distance from the top of the spring locking assembly 4 and 6 to the bottom of the connector 3, length 7, is set by table 1.

The assembly provides the electrical and mechanical connection for the arrester module 1 to the line, or power side, connection. Under normal operating conditions the arrester will operate to remove voltage surges from the power connection thereby providing continuous surge protection for the connected equipment.

In the event the arrester reaches its end of life by means of age, excessive surges or internal system breakdown, the subsequent current will cause the isolator 2 to operate. Operation of the isolator 2 will drive the line spacing buss 5 away from the clamp 3 with significant force.

Once the line spacing buss reaches the 90 degree position, the spring assembly 4 and 6, or alternate design 4, 8 and 9, will lock out the line spacing buss 5 in the 90 degree position. Locking the line spacing buss 5 in the 90 degree position prevents from bouncing back toward the line clamp 3 and reestablishing an arc.

During the movement of the line spacing buss 5, the system current protection device 10 will interrupt the current generated by the arc. The external gap 7, minimum length of table 1 by system voltage, created by the line spacing buss 5 lockout provides sufficient insulation to allow the system voltage to be restored post current interruption by the current protection device 10.

The ground current sensing device 11 will provide the system feedback to detect the arrester has conducted fault current and allow, through system settings, to automatically restore power to the system via automatic reclose operation of the current protection device 10.

The gap 7 set by the lockout of the line space buss 5, maximum length by system voltage per table 1, is also set so that the gap will spark (arc) over from a subsequent voltage impulse surge, such as induced from lightning, and provide extended surge protection for the connected equipment. This provides the ability to immediately restore power at end of life with extended surge protection until the next replacement outage can be scheduled at a more appropriate time.

TABLE 1

| System Line To Line Voltage Range | Minimum Gap size (7) | | Maximum Gap Size (7) | |
|---|---|---|---|---|
| kV | IN | CM | IN | CM |
| 2 kV-10 kV | 0.75 | 1.9 | 2 | 5.1 |
| 10 kV-15 kV | 1 | 2.5 | 3 | 7.6 |
| 16 kV-27 kV | 2 | 5 | 4 | 10 |
| 28 kV-37 kV | 3 | 8 | 6 | 15 |
| 38 kV-50 kV | 4 | 10 | 9 | 23 |
| 50 kV-80 kV | 8 | 20 | 14 | 36 |
| 80 kV-125 kV | 10 | 25 | 20 | 51 |
| 125 kV-150 kV | 15 | 38 | 25 | 64 |
| 150 kV-170 kV | 20 | 51 | 30 | 76 |
| 170 kV-250 kV | 30 | 76 | 35 | 89 |
| 250 kV-400 kV | 35 | 89 | 40 | 102 |
| 400 kV-600 kV | 50 | 127 | 55 | 140 |
| 600 kV-800 kV | 60 | 152 | 70 | 178 |

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. An arrester add on assembly comprising:
   a spring-loaded locking mechanism (4 & 6) in spring contact with a line spacing buss (5), wherein the line spacing buss (5) is connected to an isolator (2), wherein the isolator (2) is connected to a line connector clamp (3), wherein the line spacing buss (5) comprises a length that is predetermined such that a gap (7) from the top of the spring locking assembly to the bottom of the line connector clamp (3) is set by table 1:

TABLE 1

| System Line To Line Voltage Range | Minimum Gap size (7) | | Maximum Gap Size (7) | |
|---|---|---|---|---|
| kV | IN | CM | IN | CM |
| 2 kV-10 kV | 0.75 | 1.9 | 2 | 5.1 |
| 10 kV-15 kV | 1 | 2.5 | 3 | 7.6 |
| 16 kV-27 kV | 2 | 5 | 4 | 10 |
| 28 kV-37 kV | 3 | 8 | 6 | 15 |
| 38 kV-50 kV | 4 | 10 | 9 | 23 |
| 50 kV-80 kV | 8 | 20 | 14 | 36 |
| 80 kV-125 kV | 10 | 25 | 20 | 51 |
| 125 kV-150 kV | 15 | 38 | 25 | 64 |
| 150 kV-170 kV | 20 | 51 | 30 | 76 |
| 170 kV-250 kV | 30 | 76 | 35 | 89 |
| 250 kV-400 kV | 35 | 89 | 40 | 102 |
| 400 kV-600 kV | 50 | 127 | 55 | 140 |
| 600 kV-800 kV | 60 | 152 | 70 | 178 | wherein the line spacing buss (5) is configured such that movement of the line spacing buss (5) to a 90 degree position will lock the line spacing buss (5) in the 90 degree position.

2. The arrester add on assembly of claim 1 wherein the line spacing buss (5) is mechanically connected to a spring.

3. The arrester add on assembly of claim 1 wherein the length of the line spacing buss (5) will set the gap (7) within a range set by table 1 by system voltage the arrester will be applied on.

4. The arrester add on assembly of claim 1 wherein the gap (7) set by table 1 and is within a range determined by the minimum and maximum length in table 1 wherein the minimum length in table 1 is based on a minimum 60 cycle voltage air insulation level of a system the arrester is to be applied on and further wherein the maximum length in table 1 is based on the maximum air gap impulse insulation for a 20% protective level set as calculated by ANSI C62.2 application guide.

5. The arrester add on assembly of claim 1 further comprising:
   an alternate spring locking assembly mechanism (4) with spring (8) and locking pin (9).

* * * * *